United States Patent [19]

Fleming et al.

[11] Patent Number: 4,895,414

[45] Date of Patent: Jan. 23, 1990

[54] WHEEL COVER ATTACHMENT ASSEMBLY

[75] Inventors: Alvin R. Fleming, Barnhart; John Chiodo, Chesterfield, both of Mo.

[73] Assignee: Siegel-Robert, Inc., St. Louis, Mo.

[21] Appl. No.: 150,614

[22] Filed: Feb. 1, 1988

[51] Int. Cl.⁴ .............................................. B60B 7/06
[52] U.S. Cl. ......................... 301/37 PB; 301/37 CD; 301/37 R
[58] Field of Search ................ 301/37 R, 37 P, 37 C, 301/37 CD, 37 TP, 37 PB

[56] References Cited

U.S. PATENT DOCUMENTS

| | | | |
|---|---|---|---|
| 3,873,161 | 3/1975 | Kretschmer | 301/37 B |
| 3,918,763 | 11/1975 | Harris | 301/37 B |
| 3,970,346 | 7/1976 | Kretschmer | 301/37 R |
| 4,231,619 | 11/1980 | Beisch et al. | 301/37 P |
| 4,363,520 | 12/1982 | Connell | 301/37 P |
| 4,383,716 | 5/1983 | Osborn | 301/37 R |
| 4,461,514 | 7/1984 | Schware | 301/37 CD |
| 4,523,789 | 6/1985 | Schwarz | 301/37 P |
| 4,598,952 | 7/1986 | Arvidsson | 301/37 C |
| 4,740,038 | 4/1988 | Okano et al. | 301/35 TP |

*Primary Examiner*—Russell D. Stormer
*Attorney, Agent, or Firm*—McPherson D. Moore

[57] ABSTRACT

A wheel cover attachment assembly for vehicles has an engagement clip member and a detent member which fit together. Arms project from the clip. The arms having a pointed end to facilitate entry into the groove of a tire rim. The arms have claws to diggingly grip into the rim. The clip has projecting feet with toes for gripping a recess wall of a wheel cover to hold the clip thereto. The detent has a projecting nose which is aligned with the clip arms, and a pair of legs aligned with the clip legs. The end of the detent nose has an upper slanted surface and an arcuate underside to facilitate removal from the rim. The detent has bosses that fit in holes of the clip to hold the two together during assembly. The detent nose is of a resilient self-lubricating material such as plastic. The detent nose and the clip arms are shaped so that upon insertion, a side of the nose has substantial contact with the tire rim while the edges of the clip arms do not. The detent and clip have tapered lower sections to fit with a tapered recess in the cover. The clip and detent both have a pair of legs for fitting about a rib within the cover recess. When the clip is inserted, the clip feet are pressed inwardly, and the detent rests atop the feet ends and beneath a clip flange. The inner recess wall of the cover is flexible to bend inwardly when the clip trunk presses against it during insertion.

45 Claims, 1 Drawing Sheet

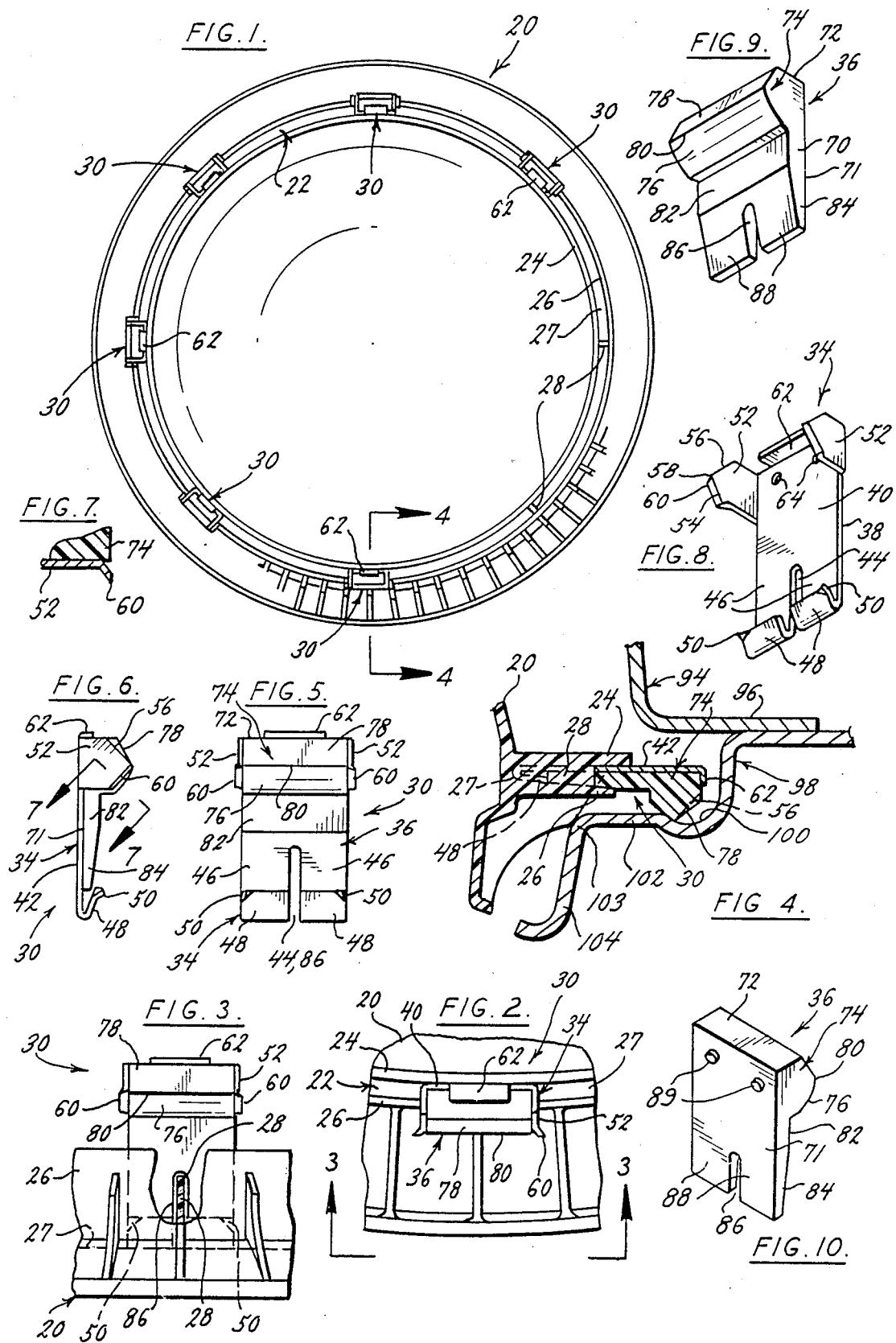

WHEEL COVER ATTACHMENT ASSEMBLY

BACKGROUND AND FIELD OF THE INVENTION

The present invention relates to the attachment of covers to wheels of vehicles. Such covers are needed to protect the internal wheel and rim structure, most notably the nuts and bolts that hold the rim to the wheel. Covers also provide aesthetic designs with the wheels, in place of the unsightly wheel and rim structure. Heretofore various types of arrangements have been used to hold such covers to the tire rims.

Some prior wheel covers have employed a complicated arrangement of annular spring rods that press multiple latching members outwardly into an annular groove of the tire rim. Other previous devices have lug members that are integrally molded with the rest of the wheel cover. These lugs act to engage in the annular tire groove. However, if one of such lugs breaks, the entire wheel cover is rendered useless.

Other devices heretofore used have included a clip that fits with the cover and which has a projection that fits within the tire rim groove. Examples of such clips are shown in Connell U.S. Pat. No. 4,363,520; Schwarz U.S. Pat. No. 4,523,789; and Beisch et al U.S. Pat. No. 4,231,619.

Other such arrangements are shown in Harris U.S. Pat. No. 3,918,763; Arvidsson U.S. Pat. No. 4,598,952; and Kretschmer U.S. Pat. No. 3,970,346.

The Connell patent shows various sorts of clips held in an annular recess of a wheel cover. FIG. 4 of the Connell patent shows a plastic retainer which has a part fitting within the tire rim groove and a part that projects into a recess in the wheel cover. However, such a retainer, being made of plastic, does not provide adequate gripping force needed to hold the wheel cover to the tire rim, nor does it provide the strength necessary. The Connell clip further has separate molded legs 43a and 43b which are necessary to provide appropriate spring action during insertion. This militates against retention once the cover is installed. Further, in order to hold the Connell retainer to the cover, a hole in the recess wall is needed to receive a locking cam.

The Connell patent shows other retainers which are made of steel. The version of the clip shown in FIG. 2 has a U-bend that extends into an arm with a barb for engaging a tire rim. Sharp tabs help hold the clip within the recess of a cover. The Connell patent shows other versions of steel clips as well.

The Schwarz patent shows a clip with an arm having barbs to hold the arm in a cover recess. The clip has a U-shaped bend which extends into a curved arm having barbs for pressing against the surface of a tire rim.

The Beisch patent shows a clip with a tab fitting within a cover recess. The clip has an extended member which is bent at several turns. A barb projects from the clip and fits against the tire rim surface.

Such prior clip arrangements have shortcomings in providing gripping strength and in providing the resiliency needed to facilitate attachment and detachment of the cover. The U-bends and other bends in such prior devices provide less than desirable gripping action and strength, and create difficulties in manufacturing, as well. The steel composition of such clips can also create problems with the insertion and removal of the assemblies because of the lack of proper resilient action at appropriate times.

SUMMARY OF THE INVENTION

The present invention improves over the prior art. The invention combines in a single retention assembly resiliency and self-lubrication action, and also stability, strength and secure gripping action. The invention has many features which are more broadly set out in the claims. An embodiment of the invention features a metal clip and a resilient self-lubricating detent member. A plurality of the assemblies can be symmetrically spaced and firmly attached to a wheel cover to hold it to a vehicle wheel rim.

In an embodiment of the invention, the clip has a trunk with projecting arms. On the underside of the arms is a projecting claw with a sharp edge. The clip has a pair of projecting feet with toes which fit within the recess of the cover. When inserted, the toes dig against a wall to resist removal of the clip. The clip can be unitary, and can be easily stamped from a sheet of metal.

The detent member can be easily assembled with the clip by hand. The detent member preferably fits within the clip arms. The detent has a projecting nose that is aligned with the arms. The nose has an upper entry surface which projects beyond the corresponding surface of the arm. This facilitates attachment by allowing the resilient detent surface to initially engage the tire rim surface upon insertion while spacing the metal arms away from such engagement. The undersurface of the nose preferably is arcuate to facilitate removal of the assembly from the tire rim groove after insertion. The resilient self-lubricating nature of the detent nose allows ease of insertion, as the slick nose surface glides more freely over the tire rim surface during attachment and detachment of the cover.

The assemblies can be easily installed in the cover. Locking bosses project from the detent to lock with openings in the clip trunk to hold the two together during installation. The detent has a lower portion that is tapered to fit the tapered cover recess. When the assembly is inserted within the cover recess, the recess walls press the clip feet inwardly against the clip trunk. The length of the detent is such that upon insertion, the lower edge of the detent rests against the top edge of the inwardly pressed feet, and the top of the detent rests against the underside of a flange extending from the clip trunk.

The cover recess has a rib therein. The clip and detent both have legs that fit about the rib to resist movement of the assembly along the cover recess. The cover recess inner wall is preferably resilient. Upon insertion, when an inner force is exerted against the detent nose and clip arms, the clip trunk is pressed inwardly and presses the resilient wall inwardly, to allow easier movement and clearance of the detent along the tire rim.

Upon insertion of the clip in the tire rim groove, the strong arms of the clip provide firm gripping strength for the claws extending therefrom. The clip arms preferably project substantially straight from the trunk, without any U-bends or other bends that could detract against gripping action.

A plurality of assemblies can be spaced about the cover to provide uniform gripping action to the wheel. The assemblies can be used for many different shapes of wheel covers and can fit with all types of tire rim grooves.

Spring steel composition provides good strength and gripping action for the clip. Plastic, such as nylon, provides a slick entry surface and resiliency for the detent member.

The invention thus provides a strong, and durable retention assembly with excellent gripping action, which provides convenience in manufacturing and ease in assembly and in installation, yet is adaptable to covers and rims of all sizes and shapes.

DESCRIPTION OF THE DRAWINGS

FIG. 1 is a side elevation looking toward the interior of an automobile wheel cover, with a plurality of retention assemblies mounted within an annular recess of the cover;

FIG. 2 is an enlargement of a portion of the cover of FIG. 1, showing greater detail for one of the retention assemblies fitting within the annular recess;

FIG. 3 is a view taken on the line 3—3 of FIG. 2, with part of the wheel cover broken, showing in particular a rib within the cover recess extending between the legs of an engagement clip and a detent member of the assembly;

FIG. 4 is a sectional view of the wheel cover, a retention assembly, and an automobile wheel and tire rim, with the detent member shown fitting within an annular groove of the rim;

FIG. 5 is a front plan view of a retention assembly with the detent member mounted with the clip;

FIG. 6 is a side view of the retention assembly of FIG. 5;

FIG. 7 is a section taken on the line 7—7 of FIG. 6, showing in particular the outwardly flared claw of an arm of the engagement clip;

FIG. 8 is an isometric view of an engagement clip of the assembly, with the detent member removed;

FIG. 9 is an isometric view of the detent member without the clip showing the front side of the detent; and FIG. 10 is an isometric view of the detent showing the rear side of the detent with two locking bosses.

DESCRIPTION OF PREFERRED EMBODIMENT

FIG. 1 shows the inside of a plastic automobile wheel cover 20. The cover 20 has an annular recess 22. The recess 22 is formed by an inner annular wall 24, an outer annular wall 26, and a floor 27. The walls 24 and 26 taper from a larger upper opening to a more narrow width adjacent floor 27. A plurality of ribs 28 are equally spaced about the recess 22. Each rib 28 connects the walls 24 and 26. Two exposed ribs 28 are shown in FIG. 1, and one rib 28 is illustrated in FIG. 3.

Equally spaced along the recess 22 are a plurality of novel retention assemblies 30. Each assembly 30 comprises an engagement member, shown as the clip 34 illustrated individually in FIG. 8. Each assembly 30 also comprises a detent member 36, seen individually in FIG. 9.

Referring first to the clip 34, each clip is made of carbon-spring steel. Each clip 34 has a trunk 38 having a front surface 40 and a rear surface 42. Toward the bottom of trunk 38 is a slot 44 which divides the clip into a pair of legs 46. At the bottom of each leg 46 is an integral upturned foot 48. Each foot has an integral toe 50 which bends forwardly from foot 48 at an angle of approximately 45°.

Toward the top of trunk 38, the clip 34 has a pair of integral arms 52 projecting forwardly therefrom. Each arm 52 extends forwardly into lower and upper slanted edges 54 and 56, respectively. Edges 54 and 56 come generally to a point 58. The lower slanted edges 54 each have an outwardly flaring elongated claw 60. The outer elongated edge of claw 60 is a sharp ridge. Claw 60 extends outwardly from arm 52 approximately 0.010 inch (0.0254 cm.). Claw 60 digs into a tire rim, as will be described, to retain the cover 20.

At the top of the clip trunk 38 is a forwardly projecting head flange 62. Just beneath flange 62, trunk 38 has a pair of circular holes 64 extending therethrough.

Turning now to the detent 36, the detent can be of plastic, such as nylon. The detent has a body 70 with a substantially flat rear surface 71, and a substantially flat head surface 72. At the top of detent body 70 is an extension in the form of a nose 74. Nose 74 has lower and upper slanted surfaces 76 and 78 which come to a junction at a linear peak 80. The underside 76 is arcuate shaped to assist in removal of the detent nose 74 and the assembly 30 from the tire rim. The upper nose surface 78 is substantially flat.

Beneath the nose 74 detent 36 has a midsection 82. Beneath midsection 82 the lower end of detent 36 has a section 84 that tapers from a thicker section downwardly into a thinner thickness. A slot 86 divides section 84 section 84 into two legs 88. A pair of circular lock plugs 89 project from the rear detent surface 71. Bosses 89 have a circular diameter to snugly fit telescopically within clip holes 64.

As seen particularly in FIGS. 5 and 6, when mounted together detent 36 has its rear body surface 71 fitting flush against the front surface 40 of clip trunk 38. The lock bosses 89 fit snugly within clip holes 64, to hold the detent 36 in position. The detent head surface 72 fits against the underside of head flange 62. The peak line 80 of the detent nose 74 is substantially aligned with the points 58 at the front end of arms 52. As seen in FIGS. 4 and 6, the detent nose peak 80 projects at approximately the same distance as do the points 58 of the arms 52. The bottom of the detent legs 84 fit just within the clip feet 48 and the clip legs 46.

As seen more particularly in FIG. 5, the detent nose 74 fits with its sides flush against the inside surfaces of arms 52. Further as seen in FIG. 5, the detent slot 86 is aligned with the clip slot 44. The detent legs 88 are in alignment with the clip legs 46. The fitting of detent 36 with clip 34 is such that detent 36 can be slid easily in and out of its mounting with the clip shown in FIGS. 5 and 6 to detached positions, such as in FIGS. 8 and 9.

Referring particularly to FIG. 4, the cover 20 and an assembly 30 are shown with a wheel 94 having the usual flange 96. A tire rim 98 is secured by conventional means to wheel 94. Rim 98 has an annular groove 100. Groove 100 extends into a rim wall 102 which passes into a curved bend 103, and thence into a flange 104, as known in the art.

In operation, each of the assemblies 30 can be installed by hand in the cover recess 22. This is done by first moving the detent 36 to fit with the clip 34 as illustrated in FIGS. 5 and 6. The slots 44 and 86 of the clip 34 and detent 36 are then aligned with an appropriate rib 28 extending across the cover recess 22. The clip trunk 34 and the clip 48 are aligned to fit within the recess. The hand then exerts downward force against the clip head flange 62 and the upper edges of clip trunk 38 and arms 52. If desired, a small board can be placed atop the head flange 62, and the top edges of trunk 38 and arms 52. The hand can press the board downward for a more even distribution of force.

The assembly 30 is pressed down to the position shown in FIGS. 2, 3 and 4. In this position, the lower end of the feet 48 rests against the recess floor 27 (FIGS. 3 & 4). As such downward movement occurs, recess walls 24 and 26 force the feet 48 and toes 50 toward the legs 46 to facilitate insertion. When the assembly 30 is in the FIGS. 3 & 4 position, the toes 50 dig into the recess wall 26 to resist movement of clip 30 from cover 20. Eight assemblies 30 are inserted with the cover 20, as shown in FIG. 1, although a greater or smaller number can be used depending upon the shape and size of the cover, the wheel and the tire rim involved.

To attach the cover 20 to the rim 98, the cover is placed so that each assembly 30 is positioned between the wheel flange 96 and rim wall 102. The cover 20 is then pressed inwardly. As this occurs, each detent nose surface 74 slides against the rim 103 until the nose peak 80 rests against rim wall 102. As such movement occurs, the pressure against detent nose 74 presses the rear surface 42 of the clip trunk 38 backward against the plastic recess wall 24. Plastic wall 24 flexes under this pressure to thus permit detent nose 74 and the clip trunk 38 to rock backwardly toward the center of the cover 20. This allows the nose 74 and clip arms 52 to easily pass along rim wall 102 toward rim groove 100.

As seen in FIGS. 4 and 6, the slant of the upper side 56 of clip arms 52 is at a lesser angle than the slant of the upper surface 78 of nose 74. Thus, during insertion, the slick self-lubricating plastic surface 78 engages the tire rim, and not the steel surface of arm edge 56. This facilitates entry of the nose 76 and the arms 52.

Further movement of cover 20 glides the peak 80 over rim wall 102, until nose 74 reaches rim groove 100. When this occurs, the spring action of clip 34 forces the detent nose 74 and clip arms 52 against the surface of groove 100, as shown in FIG. 4. In this position, the arcuate surface 76 of nose 74 rests against the outer edge of groove 100. The sharp edges of flared claws 60 dig into the surface of groove 100. The grip of claws 60 helps to retain the assemblies 30 within groove 100 during travel along the road, and during any jars that might occur in accommodating bumps or objects on the road.

To remove cover 20 from rim 98, the cover is grasped at points so that a more or less even distribution of removal force can be applied thereto. The wheel cover 20 is firmly pulled outwardly to pull the assemblies 30. With such force, the clips 34 do not become removed from the cover 20 because of the digging action of the toes 50 against the cover wall 26. The clips 34 and detents 36 are thus pulled away from groove 100 with the arcuate nose surfaces 76 gliding along the groove 100. The slick self-lubricating nature of the plastic surface 76 facilitates removal of the detent nose 74.

The projection of the claws 60 is such that a human gripping force applied to the cover 20 can overcome the gripping action of the claws 60 when they are used in combination with the nose undersurface 76.

As seen in FIG. 4, when the clip feet 44 are inserted, they are pressed backwardly toward clip legs 46 to the extent that the bottom edge of detent legs 88 can no longer fit between the upper edge of feet 48 and the legs 46. Thus, the detent 36 is held at its top surface 72 against clip flange 62, and at its lower end against the upper edges of feet 48, as well as by the bosses 89. As a result, there is no sliding movement of the detent 36 alongside the clip 34.

As also seen in FIG. 4, the length of the tapered section 84 of detent member 36 extends to the outer edge of recess wall 36. The tapered section 4 thus fits snugly within the conforming tapered shape of the recess 22.

With the assembly 30 mounted as in FIGS. 3 & 4, the recess rib 28 within the clip legs 46 and detent legs 88 resists movement of clip 34 and detent 36 from side to side. Thus, rotation of the assemblies 30, so that an assembly 30 becomes closer to one assembly than to another assembly, is prevented.

In a preferred embodiment, the thickness of the clip trunk 38, arms 52 and feet 64, can be approximately 0.030 inches (0.076 cm.). The height of the arms 52 can be approximately 0.42 inches (1.11 cm.). The length of the arms 52 to the points 58 can also be approximately 0.42 inches (1.11 cm.). The distance from the underside of head flange 62 to the top of slot 44 can be approximately 0.94 inches (2.39 cm). The length of the trunk 38 from its top to the bottom of the upturned feet 44 can be approximately 1.54 inches (3.91 cm). The length along the trunk 38 to the point of the upper edge of the out-turned feet can be approximately 0.25 inches (0.64 cm). The head flange can have a width of approximately 0.50 inch (1.27 cm). The width of the clip trunk can be approximately 0.876 inch (2.23 cm).

The clip 34 can be stamped from a single sheet of metal, such as heat treated carbon spring steel, and bent and cut to have the integral features provided. The detent 36 can be molded to be unitary.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a wheel cover for an automotive vehicle wheel having a rim, the rim having an interior annular groove with an interior surface;
   an attachment assembly comprising:
   (a) an engagement member for mounting to the wheel cover, the engagement member having a projection for engaging the interior surface of the annular groove of the rim; and
   (b) a detent member made of a different material than the engagement member and mounted with the engagement member, the detent member having an extension for contacting the rim and fitting within the annular rim groove, the extension being positioned alongside the engagement member projection when the projection and extension are within the groove of the rim.

2. The attachment assembly of claim 1 wherein the engagement member has a pair of projections for engaging the groove surface of the rim.

3. The attachment of claim 2 wherein the detent member extension is interposed between the projections of the engagement member.

4. The attachment assembly of claim 1 wherein the projection is substantially straight.

5. The attachment assembly of claim 1 wherein the projection is integral with the engagement member.

6. The attachment assembly of claim 1 wherein the engagement member comprises spring steel, and wherein the detent member extension comprises plastic.

7. The attachment assembly of claim 1 wherein the detent member comprises a resilient, self-lubricating material.

8. The attachment assembly of claim 7 wherein the detent member comprises nylon.

9. The attachment assembly of claim 1 further comprising means for holding the engagement member to the cover to resist removal therefrom.

10. The attachment assembly of claim 9 wherein the cover has a recess, wherein the holding means comprises a foot projecting from the engagement member and being integral therewith, the foot having a top, and a flange projecting integrally from the engagement member, the foot being springlike so that upon insertion of the foot into the recess, the foot is forced toward the engagement member, the detent member having a top and a lower edge, and wherein the length of the detent member is such that the lower edge of the detent rests on the top of the foot and the top of the detent member abuts the flange.

11. The attachment assembly of claim 1 further comprising interlocking means for locking the engagement member with the cover to resist movement of the clip along the cover.

12. The engagement member of claim 1 wherein the projection and the foot are unitary with the engagement member.

13. The attachment assembly of claim 12 wherein the engagement member has an integral head extending therefrom for holding the detent member in position.

14. The attachment assembly of claim 1 wherein the detent member has a body with a rear surface, and the engagement member has a trunk with a front surface, and wherein the detent member is mounted in association with the engagement member so that the rear surface of the detent member body faces against the front surface of the engagement member trunk.

15. The attachment assembly of claim 14 further comprising means for fastening the detent member in alignment with the engagement member prior to attachment of the assembly to the cover.

16. The attachment assembly of claim 15 wherein the fastening means comprises a boss in one of the members interacting with a hole in the other member.

17. The attachment assembly of claim 1 wherein the projection has a claw extending away from the projection for gripping the rim.

18. The attachment assembly of claim 1 wherein the detent extension has an upper surface, and the projection has an upper surface, wherein the upper surface of the detent extension extends beyond the upper surface of the projection, so that when the assembly is inserted into a tire rim, the detent extension surface engages the rim to space the projection arm upper surface away from the rim surface.

19. The attachment assembly of claim 1 wherein the projection has an end of a generally pointed shape.

20. The attachment assembly of claim 1 wherein the extension has an underside of an arcuate shape.

21. An attachment assembly for holding a wheel cover to the rim of a vehicle wheel, comprising:
(a) a spring steel clip, the clip having a trunk with a front surface, with the trunk having near its top a pair of substantially straight projecting arms integral with the trunk, the arms extending substantially perpendicular to the trunk front surface, each arm having an inside surface and a claw for engaging the rim; and (b) a detent member comprising a resilient selflubricating material, the detent having a body with a rear surface which faces the front surface of the engagement member wall, and a nose extending in the same direction as the arms, the nose acting to contact the rim and to facilitate engagement of the arms against the rim, the nose being interposed between the inside surfaces of the arms to abut those surfaces.

22. An attachment assembly for holding a wheel cover to the rim of an automotive vehicle wheel, the cover having a recess, comprising:
(a) an engagement member, the engagement member having a projection for engaging the rim;
(b) a detent member associated with the engagement member, the detent member having a top and a lower edge, and having an extension for contacting the rim, the extension positioned alongside the engagement member projection; and
(c) means for holding the engagement member to the cover to resist removal therefrom, comprising a foot projecting from the engagement member and being integral therewith, the foot having a top and a flange projecting integrally from the engagement member, the foot being springlike so that upon insertion of the foot into the recess, the foot is forced toward the engagement member, and wherein the length of the detent member is such that the lower edge of the detent rests on the top of the foot, and the top of the detent member abuts the flange.

23. A attachment assembly for holding a wheel cover to the rim of a wheel for a motor vehicle, the rim having an annular groove, the cover having an annular recess with a wall, comprising:
(a) a spring steel clip, the clip having a trunk with a front surface, and a pair of arms projecting integrally from the trunk;
(b) each arm having a claw integral therewith projecting outwardly therefrom for gripping against the rim;
(c) the clip having a foot near the bottom thereof which projects outwardly from the wall, the foot being shaped to fit within the recess of the cover;
(d) a detent member for fitting with the clip, the detent member comprised of a resilient self-lubricating material, the detent having a projecting nose fitting within the clip arms and projecting in the same direction as the arms, the nose having an upper surface for contacting the rim during insertion of the assembly with the rim, the nose surface projecting beyond the corresponding part of the arm to space the arm from contact with the rim during part of the insertion movement for facilitating engagement with the rim; and
(e) the detent member having a height less than the height of the clip.

24. The attachment assembly of claim 23 wherein the clip has a head flange projecting in the same direction as the arms, the head flange fitting above the detent nose to maintain the detent member alongside the clip.

25. The attachment assembly of claim 23 wherein the clip legs each have a foot integral with the leg being turned upward from the bottom of the leg, each foot shaped to fit within the cover recess so that the feet press against a recess wall, each foot having an outwardly turned toe for gripping the recess wall.

26. An attachment assembly for use with a wheel and rim of a motor vehicle, the rim having an annular groove, comprising:
(a) a cover, the cover having a recess with a flexible wall forming part of the recess;
(b) an engagement member separate from the cover, the engagement member having a projection for engaging the groove of the rim;
(c) a detent member comprising a resilient self-lubricating material associated with the engagement member and being separate from the cover, the detent member having an extension for contacting the rim, the extension being positioned alongside the engagement member projection so that both the detent extension and the engagement member fit within the rim groove when the cover is mounted to the wheel;
(c) the engagement member and detent member being positioned within the recess so that during insertion movement of the cover with the tire rim, force of the tire rim against the detent member and engagement member prior to insertion of those members into the groove flexes the recess wall inwardly to allow the engagement member and detent member to move inwardly to facilitate insertion of those members into the groove.

27. The attachment assembly of claim 26 further comprising means for interlocking the detent member and engagement member with the cover to prevent movement of those members along the cover recess.

28. The attachment assembly of claim 27 wherein the means for interlocking comprises the cover having a rib projecting into the recess, and wherein one of the members has an opening for receiving the rib.

29. In a wheel cover for an automotive vehicle wheel having a rim, the rim having an interior annular groove with an interior surface;
an attachment assembly comprising:
(a) an engagement member, the engagement member having a trunk having a top and a bottom, the trunk having a front surface and longitudinal sides, the trunk having a pair of arms projecting in generally the same direction from the sides of the trunk so that a space is formed between the arms, each arm having an inner surface;
(b) a detent member for mounting with the engagement member, the detent member having a body with a rear surface that faces the front surface of the trunk, the detent member having an outwardly extending nose located in the space between the arms, the nose extending in generally the same direction as the arms, the nose having two side surfaces, each side surface of the nose facing an inner surface of one of the arms.

30. The attachment assembly of claim 29 wherein each side surface of the nose abuts an inner surface of an arm.

31. The attachment assembly of claim 30 wherein the body of the engagement member has an integral head extending therefrom, the head having a lower surface, the nose of the detent member having a top surface which faces the lower surface of the head.

32. The attachment assembly of claim 31 wherein the lower surface of the head is substantially flat, and the top surface of the nose is substantially flat and extends substantially parallel with the lower surface of the head and abuts the lower surface of the head.

33. The attachment assembly of claim 31 wherein the trunk of the engagement member has a foot extending therefrom, the foot having an upper part, the body of the detent member having a lower end, the lower end of the detent member being positioned above part of the foot.

34. The attachment assembly of claim 29 wherein the inner surface of each arm is substantially flat and the side surfaces of the nose are substantially flat and extend substantially parallel to the inner surface of each arm.

35. The attachment assembly of claim 29 further comprising one of the engagement member or the detent having a boss, and the other of said engagement member or detent having a recess shaped to receive the boss to hold the detent member and engagement member against movement relative to each other.

36. The attachment assembly of claim 29 wherein each arm has a claw extending away from the arm for gripping against the surface of the rim groove.

37. The attachment assembly of claim 29 wherein each arm has an end of a generally pointed shape.

38. In a wheel cover for an automotive vehicle wheel, the wheel having a rim, the rim having an interior annular groove with an interior surface, the wheel cover having a recess with a wall;
an attachment assembly for holding the cover to the wheel, comprising:
(a) an engagement member, the engagement member having a projection for engaging the interior surface of the groove of the rim;
(b) a detent member associated with the engagement member, the detent member having an extension for contacting the rim and fitting within the annular rim groove, the extension being positioned alongside the engagement member projection when the projection and extension are within the groove of the rim; and
(c) means for holding the engagement member to the cover to resist movement therefrom.

39. The assembly of claim 38 wherein the means for holding comprises a foot projecting from the engagement member for gripping the recess wall.

40. The assembly of claim 39 wherein the foot has a toe which extends outwardly from the foot to grip the recess wall.

41. The attachment assembly of claim 39 wherein the cover recess is tapered, and wherein the detent member comprises a tapered bottom section conforming in shape to the recess.

42. The attachment assembly of claim 38 wherein the holding means comprises a foot projecting from the engagement member and being integral therewith, the foot having a top, and a flange projecting integrally from the engagement member, the foot being springlike so that upon insertion of the foot into the recess, the foot is forced toward the engagement member, and wherein the length of the detent member is such that the lower edge of the detent rests on the top of the foot and the top of the detent member abuts the flange.

43. The attachment assembly of claim·42 wherein the portions for fitting about the rib comprises the engagement member and the detent member each having a slot, the slots each having a lower open end, the slots each receiving the rib.

44. The attachment assembly of claim 38 wherein the cover recess is formed in part by a second wall, said second wall being flexible and interior to the other wall, with the engagement member mounted in the recess to press the second wall inwardly when force is exerted against the engagement member from the tire rim during insertion of the cover.

45. In a cover and wheel of claim 38, a rib extending within the recess;
the attachment assembly further comprising the engagement member and the detent member each having a portion for fitting about the rib to resist movement of the assembly along the recess.

* * * * *